United States Patent Office 3,215,723
Patented Nov. 2, 1965

3,215,723
ALKYL AND HALOALKYL HALOPHENYL
CARBONATES
Joseph Willard Baker, Kirkwood, Mo., assignor to Monsanto Company, a corporation of Delaware
No Drawing. Filed May 13, 1963, Ser. No. 280,066
8 Claims. (Cl. 260—463)

This invention relates to a novel class of alkyl and haloalkyl halophenyl carbonates. More particularly, this invention is concerned with a class of new organic compounds which are alkyl or haloalkyl, hydroxy- or alkoxy-halophenyl carbonates. Such carbonates are found to possess useful and unexpected biological activity.

The novel compounds of this invention have the general formula

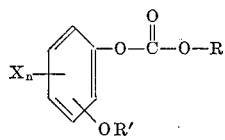

where X is selected from a group consisting of chlorine and bromine, n is an integer from 2 to 4, R' is selected from a group consisting of alkyl containing from 1 to 4 carbon atoms and hydrogen, and R is selected from a group consisting of alkyl and haloalkyl containing from 1 to 4 carbon atoms.

As illustrative of R, but not limitative thereof, are methyl, ethyl, propyl, butyl, chloromethyl, 2-chloroethyl, 2-chloropropyl, 3-chloropropyl, 2-chlorobutyl, 3-chlorobutyl, 4-chlorobutyl, bromomethyl, 2-bromomethyl, 2-bromopropyl, 3-bromopropyl, 2-bromobutyl, 3-bromobutyl, 4-bromobutyl, 2,3-dibromobutyl, 2,2,2-trichloroethyl, etc., and the various alkyl isomers containing up to 4 carbon atoms and, where R is haloalkyl, from 1 to 3 halogen atoms, such halogen atoms being selected from a group consisting of chlorine and bromine.

This novel class of compounds can be prepared by causing an alkyl or haloalkyl chloroformate to react with a halogenated alkoxyphenol or a halogenated dihydric phenol to produce the desired halophenyl carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine and the like. Examples of reactions utilizing an amine acceptor yielding a hydroxy- or an alkoxy-halophenyl carbonate are as follows:

(a)

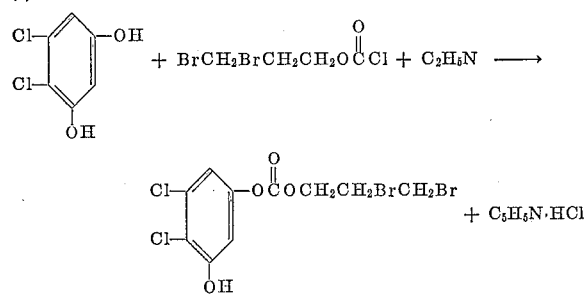

(b)

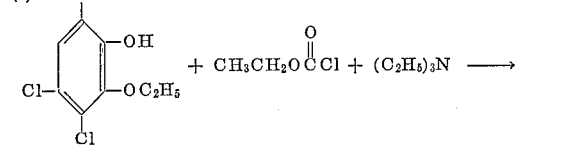

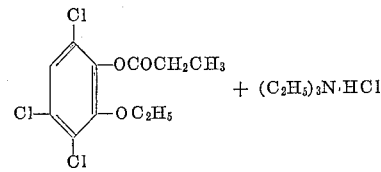

In practicing preparations such as those of Equation a or b, it is also preferred to use an inert organic solvent as the reaction medium. Among the suitable solvents are benzene, toluene, xylene, hexane, heptane, octane, propyl ether, ethyl ether, tetrahydrofuran, dioxane and the like. The reaction temperatures employed in preparing the new compounds will depend upon the particular reactants utilized to obtain a desired end product.

It should be noted that, although both are preferred, neither the tertiary amine nor the inert organic solvent are essential to the preparation of the compounds of this invention. In absence of such amine, the hydrogen chloride which forms during the reaction can be boiled off.

The invention will be more fully understood by reference to the following examples, which are set forth herein solely for the purpose of illustration and are not to be construed as limiting the scope of the present invention.

Example 1

A suitable reaction vessel is charged with 12.4 grams (0.05 mol) of tetrachlorocatechol in 250 ml. of ether. The solution is held at 25° C. and stirred during the dropwise addition of 5.1 grams (0.05 mol) of triethylamine in 15 ml. of ether over a period of about 15 minutes. The mixture is then cooled to 5° C., and 7.2 grams (0.05 mol) of 2-chloroethyl chloroformate in 25 ml. of ether is added over a period of about 30 minutes. The resultant mixture is heated to reflux temperature and held there for about 4 hours, after which it is cooled and filtered. The filtrate is evaporated to remove the ether, and the residue is recrystallized twice from acetonitrile. There is obtained 3.0 grams of 2-chloroethyl 2-hydroxy-3,4,5,6-tetrachlorophenyl carbonate, M.P. 105–106° C. Analysis shows 30.5% carbon, 1.52% hydrogen and 50.0% chlorine, as against calculated values of 30.5%, 1.42% and 50.02%, respectively, for $C_9H_5Cl_5O_4$.

Example 2

In a suitable reaction vessel, 10.7 grams (0.05 mol) of 4,5,6-trichlororesorcinol is reacted with 6.8 grams (0.05 mol) of t-butyl chloroformate according to the procedure set forth in Example 1. There is obtained t-butyl 5-hydroxy-2,3,4-trichlorophenyl carbonate in good yield.

Example 3

In a suitable reaction vessel, 13.4 grams (0.05 mol) of 3,5-dibromohydroquinone is reacted with 9.4 grams (0.05 mol) of 2-bromoethyl chloroformate according to the procedure set forth in Example 1. There is obtained 2-bromoethyl 3,5-dibromo-4-hydroxyphenyl carbonate in good yield.

Example 4

In a suitable reaction vessel, 10.7 grams (0.05 mol) of 2,4,5-trichlorocatechol is reacted with 10.3 grams (0.05 mol) of 2,3-dichlorobutyl chloroformate according to the procedure set forth in Example 1. There is obtained 2,3-dichlorobutyl 2-hydroxy-3,5,6-trichlorophenyl carbonate in good yield.

Example 5

In a suitable reaction vessel, 8.9 grams (0.05 mol) of 2,3-dichlororesorcinol is reacted with 6.1 grams (0.05 mol) of isopropyl chloroformate according to the procedure set forth in Example 1. There is obtained isopropyl 3,4-dichloro-2-hydroxyphenyl carbonate in good yield.

*Example 6*

A suitable reaction vessel is charged with 3.9 grams (0.015 mol) of 4-methoxy-2,3,5,6-tetrachlorophenol, 2.15 grams (0.015 mol) of 2-chloroethyl chloroformate and 75 ml. of ether. The resulting solution is cooled to 1–3° C. and stirred during the dropwise addition of 1.2 grams (0.015 mol) of pyridine, dissolved in 25 ml. of ether, over a period of 15 minutes. The mixture is stirred at room temperature for 3 hours and filtered to remove the by-products. The filtrate is then evaporated to yield the crude product. Recrystallization from Skellysolve B (an essentially n-hexane solvent having a boiling range of 60–70° C.) yields 3.8 grams of 4-methoxy-2,3,5,6-tetrachlorophenyl 2-chloroethyl carbonate as white crystals, M.P. 96–97° C. Analysis shows 32.3% carbon, 2.00% hydrogen and 48.0% chlorine, as against calculated values of 32.6%, 1.91% and 48.1%, respectively, for $C_{10}H_7Cl_5O_4$.

*Example 7*

A suitable reaction vessel is charged with 13.1 grams (0.05 mol) of tetrachloroguaiacol, 7.4 grams (0.05 mol) of 2-chloroethyl chloroformate and 200 ml. of ether. The resulting solution is cooled to 10–15° C. while a solution of 5.1 grams (0.05 mol) of triethylamine, dissolved in 25 ml. of ether, is added dropwise, with stirring, over a period of about 25 minutes. The mixture is then stirred at room temperature for 4 hours. The amine hydrochloride which forms is filtered off, and the filtrate is evaporated to remove the ether. The residue is recrystallized twice from hexane to yield 7.3 grams of 2-methoxy-3,4,5,6-tetrachlorophenyl 2 - chloroethyl carbonate, M.P. 90–92° C. Analysis shows 48.0% chlorine, 32.3% carbon and 1.90% hydrogen, as against calculated values of 48.1%, 32.6% and 1.91%, respectively, for $C_{10}H_7Cl_5O_4$.

*Example 8*

In a suitable reaction vessel, 11.8 grams (0.05 mol) of 2-butoxy-4,5-dichlorophenol is reacted with 10.6 grams (0.05 mol) of 2,2,2-trichloroethyl chloroformate according to the procedure set forth in Examples 6 and 7. There is obtained 2-butoxy-4,5-dichlorophenyl 2,2,2-trichloroethyl carbonate in good yield.

*Example 9*

In a suitable reaction vessel, 9.7 grams (0.05 mol) of 2,5-dichloro-4-methoxyphenol is reacted with 7.1 grams (0.05 mol) of 2-chloroethyl chloroformate according to the procedure set forth in Examples 6 and 7. There is obtained 4-methoxy-2,5-dichlorophenyl 2-chloroethyl carbonate in good yield.

*Example 10*

In a suitable reaction vessel, 14.1 grams (0.05 mol) of 3,5-dibromoguaiacol is reacted with 10.1 grams (0.05 mol) of 3-bromopropyl chloroformate according to the procedure set forth in Examples 6 and 7. There is obtained 2-methoxy-3,5-dibromophenyl 3-bromopropyl carbonate in good yield.

*Example 11*

In a suitable reaction vessel, 11.4 grams (0.05 mol) of 3-methoxy-2,4,5-trichlorophenol is reacted with 6.1 grams (0.05 mol) of n-propyl chloroformate according to the procedure set forth in Examples 6 and 7. There is obtained 3-methoxy-2,4,5-trichlorophenyl n-propyl carbonate in good yield.

The products of the present invention are useful as microbiocides adapted to be employed for the control of bacterial and fungal organisms. In a representative test, 2-chloroethyl 2-hydroxy-3,4,5,6-tetrachlorophenyl carbonate is active against *Staphylococcus aureus* at a dilution in excess of one part per million, and against *Aspergillus niger* at a dilution in excess of one part per one hundred thousand. A representative test for the corresponding 2-methoxy compound of Example 7 shows activity against *Staphylococcus aureus* at a dilution in excess of one part per one hundred thousand.

While the invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A compound of the formula,

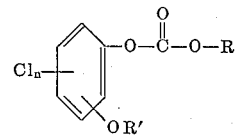

wherein $n$ is an integer from 2 to 4, R is chloroalkyl of 1 to 4 carbon atoms and 1 to 3 chlorine atoms, and R' is selected from the group consisting of hydrogen and methyl.

2. A compound of the formula,

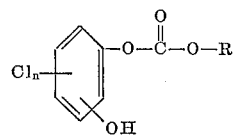

wherein $n$ is an integer from 2 to 4, and R is chloroalkyl of 1 to 4 carbon atoms and 1 to 3 chlorine atoms.

3. A compound of the formula,

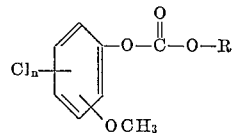

wherein $n$ is an integer from 2 to 4, and R is chloroalkyl of 1 to 4 carbon atoms and 1 to 3 chlorine atoms.

4. 2-chloroethyl 2-hydroxy-3,4,5,6 - tetrachlorophenyl carbonate.

5. 2,3-dichlorobutyl 2-hydroxy-3,5,6 - trichlorophenyl carbonate.

6. 4 - methoxy - 2,5 - dichlorophenyl 2 - chloroethyl carbonate.

7. 2-methoxy-3,4,5,6-tetrachlorophenyl 2 - chloroethyl carbonate.

8. 4-methoxy-2,3,5,6-tetrachlorophenyl 2 - chloroethyl carbonate.

References Cited by the Examiner

Beilstein: Handbuch Der Organische Chemie, Volume 6, 1st Add'n, page 390 (1931).

CHARLES B. PARKER, *Primary Examiner.*